United States Patent [19]

Prentice et al.

[11] 4,315,409
[45] Feb. 16, 1982

[54] CRYOGENIC FREEZING SYSTEM

[75] Inventors: Alan L. Prentice, Surbiton, England; Richard E. Filippi, Allentown, Pa.

[73] Assignee: Air Products and Chemicals, Inc., Allentown, Pa.

[21] Appl. No.: 219,020

[22] Filed: Dec. 22, 1980

[51] Int. Cl.³ .............................................. F25D 13/06
[52] U.S. Cl. ......................................... 62/63; 62/85; 62/266; 62/401; 62/475
[58] Field of Search ...................... 62/85, 63, 86, 401, 62/402, 266, 265, 475

[56] References Cited

U.S. PATENT DOCUMENTS

| | | | |
|---|---|---|---|
| 2,589,457 | 3/1952 | Touborg | 62/85 |
| 3,191,401 | 6/1965 | Beyer et al. | 62/85 |
| 3,484,946 | 12/1969 | Saurer | 62/123 |
| 3,520,144 | 7/1970 | Murphy | 62/85 |
| 3,572,050 | 3/1971 | Bottum | 62/85 |
| 3,733,848 | 5/1973 | Duron et al. | 25/2 |
| 3,868,827 | 3/1975 | Linhardt | 62/63 |

OTHER PUBLICATIONS

Turbo Air Centrifugal Compressors Catalog, published by Joy Manufacturing Company, Jan. 1978.
Buffalo Aeroturn Pulse Dust Collector Type P Bulletin AP-750, published by Buffalo Forge Company, Sep. 1977.

Primary Examiner—Ronald C. Capossela
Attorney, Agent, or Firm—Richard A. Dannells, Jr.; E. Eugene Innis; James C. Simmons

[57] ABSTRACT

The operation of a prior art freezer installation for freezing food can be improved by:
(1) improved refrigeration techniques;
(2) providing air curtains at the doors of the freezer;
(3) using a pulse bag filter for separating ice from the air leaving the freezer; and
(4) ensuring that the air leaving the freezer is colder than −80° F.

8 Claims, 2 Drawing Figures

CRYOGENIC FREEZING SYSTEM

The present invention relates to systems for freezing articles in a freezer using a circulation system of air at cryogenic temperatures. It is particularly concerned with a more efficient circulating air refrigeration system for large scale food freezing applications.

BACKGROUND OF THE INVENTION

Refrigeration systems employing air at cryogenic temperatures for freezing food are commercially available, for example, see U.S. Pat. Nos. 3,733,848 and 3,868,827. In the latter patent, air is compressed in a first stage compressor, cooled in an intercooler, further compressed in a second stage compressor, cooled in another intercooler, further cooled by countercurrent exchange with cold air leaving the freezer and finally expanded in an expansion turbine mechanically coupled to the second stage compressor where the gas is reduced to about $-180°$ F. before being directed into the freezer. This prior art freezer has been used in combination with a vortex separator for removing particles of ice in excess of 5 microns in diameter from the air leaving the food freezer. However, despite this separation ice has been found to build up in the regenerative heat exchanger and to result in an intolerable pressure drop across the main heat exchanger which greatly reduces the efficiency of this system.

SUMMARY OF THE INVENTION

To overcome the disadvantages of the prior art cryogenic freezers, the present novel system affords greater efficiency by replacing the first and second stage compressors and expander system of the prior art with a single refrigeration unit comprising a compressor portion and an expansion turbine portion, replacing the vortex separator with a pulse bag filter and maintaining the temperature of the air leaving the freezer at temperatures below $-80°$ F. Additional efficiency is achieved by supplying dry air to maintain an air curtain at the inlet and outlet of the freezer to prevent entry of warm, moist atmospheric air into the freezer and subsequent refrigeration loss. Finally, air is introduced into the bottom of the freezer adjacent to the freezer inlet to promote more rapid freezing of the food articles, thus limiting the dehydration of the food products and the ice formed therefrom.

In accordance with one embodiment of the present invention, but not restricted thereto, the novel system which is used for refrigeration, particularly in the rapid freezing of food products comprises a freezer having an inlet for admitting the articles to be frozen, an outlet for permitting the frozen articles to leave said freezer and a conveyor for transporting the articles through the freezer from the inlet to the outlet thereof; a refrigerant supply main connected to the freezer for introducing refrigerant air to the freezer; a return main connected to the freezer for receiving the warmed air from the freezer; a refrigeration unit having a compression section and an expansion turbine section connected to the refrigerant supply main for supplying the supply main with air at cryogenic temperatures; a main heat exchanger having a high pressure side connected between the compression and expansion turbine sections of the refrigeration unit and a low pressure side connected between the compression section of the refrigeration unit and the return main for exchanging the refrigerant value of the warmed air from the return main in the low pressure side with the air from the compression section of the refrigeration unit in the high pressure side; and bag filter means connected between the return main and the main exchanger for removing ice particles from the warmed air in said return main prior to exchanging its refrigeration value in the main heat exchanger. The filter means comprises at least one bag which is periodically pulsed to remove ice collected on the outside thereof through the pulsing action of a portion of the air leaving the high pressure side of the main heat exchanger prior to entering the expansion section of the refrigeration unit.

The refrigeration unit comprises a motor, a gear rotatable by the motor, a first shaft and a second shaft rotatable by said gear, a compressor at each end of the first shaft and a compressor at one end of the second shaft and an expander at the other end of the second shaft. The air in the system is progressively compressed by the compressors on the first shaft and by the compressor on the second shaft of the machine. The air is cooled in the main heat exchanger and is expanded in the expander of the refrigeration unit before being introduced into the freezer.

The air that is withdrawn from the freezer is passed through the bags of the pulse bag filter to remove ice particles in excess of approximately 1 micron in diameter, is warmed in the main heat exchanger and is recycled through the refrigeration unit.

The present apparatus and method thereof enable one to recover air from the exit of the freezer at temperatures colder than $-80°$ F.

DESCRIPTION OF PREFERRED EMBODIMENT

Figure 1:
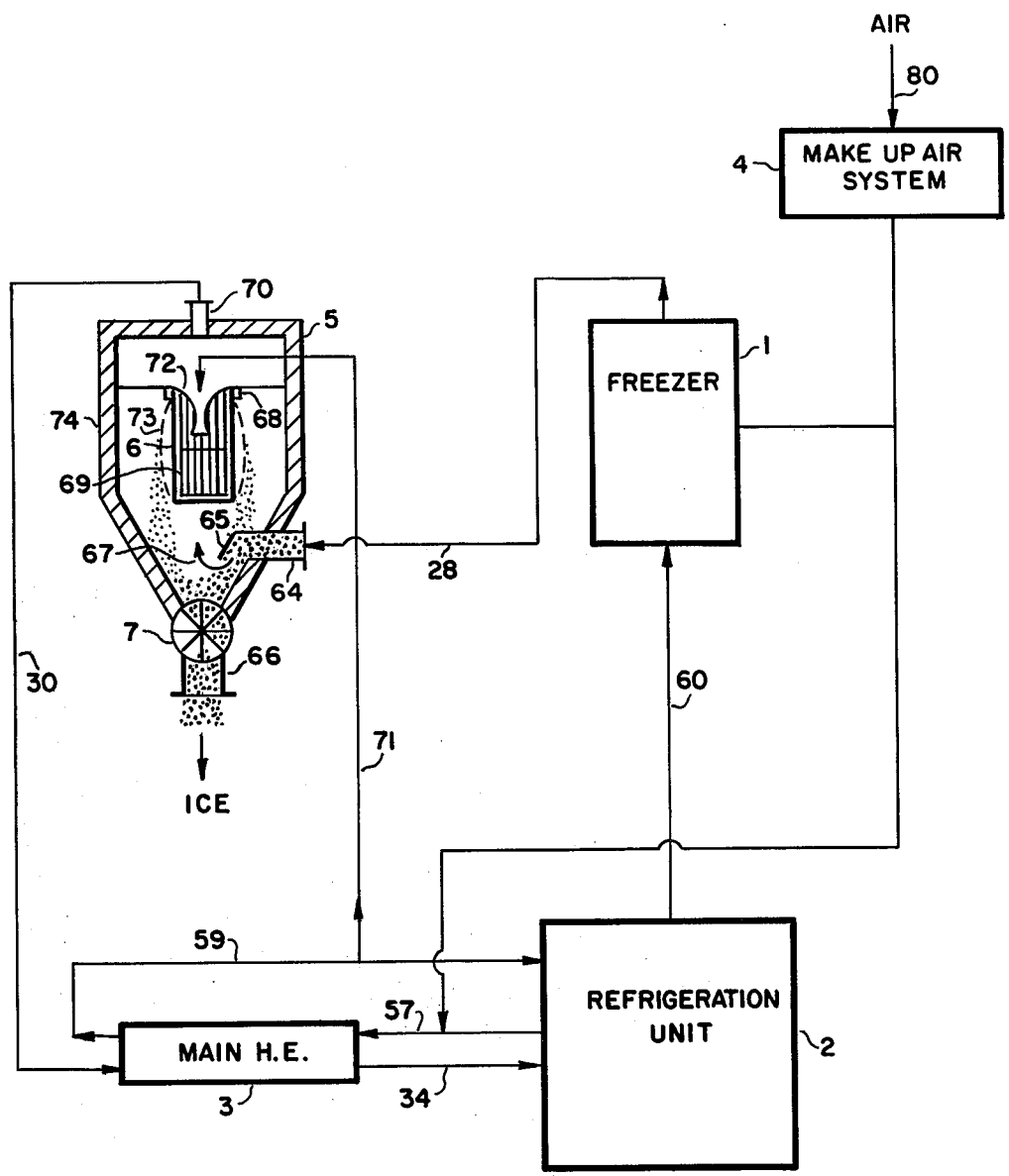
FIG. 1 is a schematic flow diagram illustrating a preferred embodiment of the present invention.

Referring now to the FIGURES, FIG. 1 illustrates the combination of freezer 1, refrigeration unit 2, main heat exchanger 3, make-up air system 4 and filter 5 comprising bag 6 and rotary valve 7. The details of the operation of filter 5 are described below.

Figure 2:
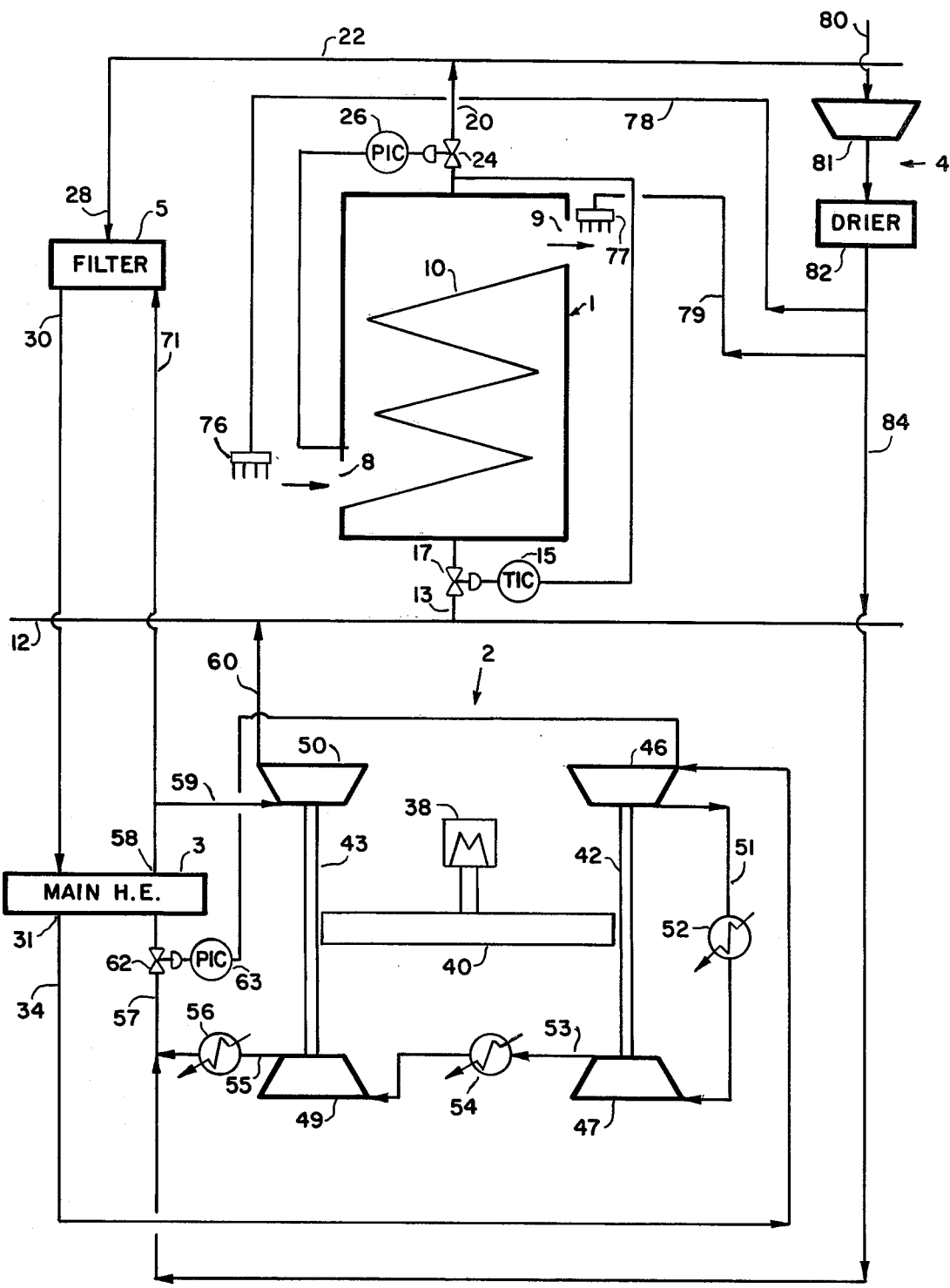
FIG. 2 is a more detailed flow diagram illustrating the preferred embodiment of the present invention.

In FIG. 2, freezer 1 is shown having feed station 8, discharge station 9 and continuous belt conveyor 10 for transporting the articles to be frozen through the freezer. One suitable freezer for use in combination with the present invention is described in pending U.S. Pat. Appln. Ser. No. 199,130 filed Oct. 22, 1980, assigned to Air Products and Chemicals, Inc., the assignee of the present application.

Air at approximately 1 atmosphere and $-205°$ F. is introduced from refrigerant supply main 12 through line 13 into freezer 1. The flow through line 13 is controlled by temperature indicating controller 15 which controls valve 17. Air at approximately $-100°$ F. exits freezer 1 through line 20 connected to return main 22. The flow of the air from freezer 1 is controlled through valve 24 by means of pressure indicating controller 26.

Air in return main 22 is passed to bag filter 5 via line 28 where the particles of ice formed from the food products being frozen are separated from the air and is designed to extract 99.9% of all the particles having a diameter of 1 micron or greater through valve 7. It is understood that for particles that are not substantially spherical, particles having their maximum dimension equal to 1 micron or greater are removed from the air in filter 5.

The substantially ice-free air from filter 5 is then passed through line 30 to main heat exchanger 3. Specifically the air in line 30 passes through low pressure side 31 of main heat exchanger 3 where it is heated to about 95° F. at a pressure of about 10.7 psia. Air from main heat exchanger 3 flows through line 34 to refrigeration unit 2. One form of refrigeration unit 2 that is suitable for use in this preferred embodiment is commercially available under the designation of TA-100 3-Stage Centrifugal Compressor from Joy Manufacturing Company, which compressor has an expansion turbine mounted on the open end of its second post thereof. This refrigeration unit comprises motor 38 which rotates gear 40 which in turn rotates first post 42 and second post 43. First compressor stage 46 is mounted on one end of first post 42 and second compressor stage 47 is mounted on the other end thereof. Third compressor stage 49 is mounted on one end of second post 43 and expander 50 is mounted on the other end thereof. Air is compressed in first compressor stage 46, passed through line 51, cooled in intercooler 52 and compressed in second compressor stage 47. The air is then passed through line 53, cooled in intercooler 54, and compressed in third compressor stage 49 to 78 psia. The air is passed through line 55 and cooled to about 100° F. in aftercooler 56. The compressed air from the compressor stage of refrigeration unit 2 is passed through line 57 and cooled to about −95° F. in the high pressure side 58 of main heat exchanger 3. The major portion of the cold air from high pressure side 58 is passed through line 59 and expanded in expander 50 before being passed into refrigerant supply main 12 via line 60. From main 12, the refrigerant air is introduced into freezer 1 at a temperature of about −205° F. and 15 psia via line 13.

The flow of air through main heat exchanger 3 is equalized by means of valve 62 and pressure indicating controller 63.

Referring to FIG. 1, air in line 28 enters filter 5 through inlet 64 and is deflected by deflector 65. The largest particles of ice fall directly into the conical bottom or hopper of filter 5 for removal through solids discharge spout 66 and rotary valve 7. The air stream 67 flows upward through at least one bag 6 mounted on clamps 68 and supported by cage 69. The ice particles remaining in the air having a diameter or largest dimension of at least 1 micron are collected on the outside of bag 6. The ice-free air passes through outlet 70 and through line 30 to main heat exchanger 3. Periodically bag 6 is pulsed by means of a small side stream, approximately 1 to 5% by weight, of high pressure air (about 75 psig) which is directed through line 71 to a position directly above venturi nozzle 72. The pulse of air stops the flow of substantially ice-free air, i.e. the air contains no more than 0.1% by weight of ice after filtration, and the pulse causes a shock wave to travel down bag 6. This wave forces bag 6 to momentarily depart from wire cage 69 to position 73 (shown in phantom), to snap back in place and to dislodge the ice built up on the outside of bag 6 into the hopper of filter 5. The composition of the bag can be of any suitable material, for example, a polyester felt bag coated with Teflon ® polymer. A suitable bag filter for this embodiment is commercially available as P-1-120 Pulse Dust Collector, which is a single width unit containing 120 bags; see Bulletin AP-750 entitled "Buffalo AEROTURN ® Pulse Dust Collector Type P" from Buffalo Forge Company, Buffalo, N.Y., September 1977 for further details of this device, the description of which is incorporated herein by reference.

The temperature of the cold air leaving high pressure side 58 is about −95° F. or within a few degrees of the air entering filter 5 from line 28. The latter is combined with the small side stream used in the pulsing action described above to form a stream at about −100° F. entering low pressure side 31 of heat exchanger 3. All of the exterior surfaces of filter 5 are provided with suitable insulation 74 to prevent heat loss of this stream in filter 5.

Referring again to FIG. 2, ingress of moist air into freezer 1 is inhibited and heat loss is prevented by air curtains 76 and 77 which are positioned above inlet 8 and outlet 9, respectively. One acceptable version of an air curtain is commercially available as Transvector ® Air Flow Amplifier. Alternatively, a venturi system powered by the small compressed air flow from make-up air system 4 through lines 78 and 79 can be utilized for this purpose.

Dry make-up air for the cryogenic refrigeration system and for the air curtains is provided by air in line 80, compressed in compressor 81 and dried in drier 82 containing a suitable dessicant such as alumina or 5A molecular sieves. The dried compressed air is combined via line 84 with air in line 57 to high pressure side 70 of main heat exchanger 3.

It is obvious from FIG. 2 that supply main 12 and return main 22 extend in both directions such that additional freezers beyond the single freezer 1 shown may be used provided that sufficient refrigeration capacity is available from unit 2. Alternatively, additional refrigeration units identical to unit 2 may be connected to the supply and return mains.

In order for refrigeration unit 2 to operate efficiently, the compressed air leaving aftercooler 56 must be cooled as effectively as possible in main heat exchanger 3. This is achieved by inhibiting the build up of ice in main heat exchanger 3 by: (1) the provision of air curtains 76 and 77, (2) bag filter 5 and (3) maintaining the air leaving freezer 1 colder than −80° F. Most of the ice is likely to form on high pressure side 58 of main heat exchanger 3. Using the process of the present invention the rate of icing is reduced by a factor of roughly 5, if the temperature of air leaving freezer 1 is −100° F., when compared with the rate of icing in cryogenic freezers of the type described above in connection with a discussion of the prior art.

What is claimed is:

1. In an apparatus for freezing articles comprising in combination a freezer having an inlet for admitting the articles to be frozen, an outlet for permitting the frozen articles to leave said freezer and a conveyor for transporting the articles through said freezer from said inlet to said outlet thereof; a refrigerant supply main connected to said freezer for introducing refrigerant air to said freezer; a return main connected to said freezer for receiving the warmed air from said freezer; refrigeration means connected to said refrigerant supply main for supplying said supply main with air at cryogenic temperatures; and a main heat exchanger having a high pressure side connected to said refrigeration means and a low pressure side connected between said refrigeration means and said return main for exchanging the refrigerant value of said warmed air from said return main in said low pressure side with the air from said refrigeration means in said high pressure side; the improvement which comprises:
   (a) said refrigeration means comprising a single refrigeration unit having a compression section and an expansion turbine section connected to said refrigeration supply main;
   (b) said high pressure side of said main heat exchanger being connected between said compression and expansion turbine sections of said refrigeration means and said low pressure side being connected between said compression section of said refrigeration means and said return main, whereby the refrigeration value of said warmed air is exchanged with the air from said compression section of said refrigeration means in said high pressure side; and
   (c) bag filter means connected between said return main and said main exchanger for removing ice particles from the warmed air in said return main prior to exchanging its refrigeration value in said main heat exchanger, which filter means comprises at least one bag which is periodically pulsed to remove ice collected therein.

2. The apparatus of claim 1 wherein the ice particles are removed in said bag filter means through the pulsing action of a portion of the air leaving the high pressure side of said main heat exchanger and have a diameter of 1 micron or greater.

3. The apparatus of claim 1 wherein air is introduced into said freezer at or colder than $-180°$ F. and is withdrawn from said freezer colder than $-80°$ F.

4. The apparatus of claim 1 wherein means are provided for supplying a curtain of dry air over said inlet and said outlet to control heat loss from said freezer.

5. In a method for cryogenically freezing articles comprising the steps of:
   (a) contacting articles in a freezer with air at a temperature of about $-180°$ F. or colder;
   (b) continuously withdrawing a portion of the warmed air from the freezer after contacting the articles within the freezer with the air;
   (c) alternately compressing the warmed air from step (b) and cooling the compressed air stream to a temperature substantially above $-180°$ F.;
   (d) exchanging the refrigeration valve of the air from step (b) with at least a portion of the compressed air stream from step (c); and
   (e) expanding the compressed air stream from step (d) to cool it to a temperature of about $-180°$ F. or colder for use in said freezer;
the improvement which comprises passing the warmed air from step (b) through a bag of a bag filter and collecting the ice particles on the outside of the bag and carrying out steps (c) and (e) in a single refrigeration unit.

6. The method of claim 5 wherein the ice particles collected on the bag of said bag filter have a diameter of one micron or greater.

7. The method of claim 5 or 6 wherein a small portion of the compressed air stream from steps (d) and (e) is periodically passed to said bag filter to dislodge the ice collected on the bag.

8. The method of claim 5 or 6 wherein at least 99.9% by weight of the ice particles are removed from the warmed air leaving the freezer.

* * * * *